June 8, 1965  O. B. CRUSE  3,187,642
FRICTION DEVICE OPERATING MECHANISM
Filed Oct. 12, 1962  3 Sheets-Sheet 2

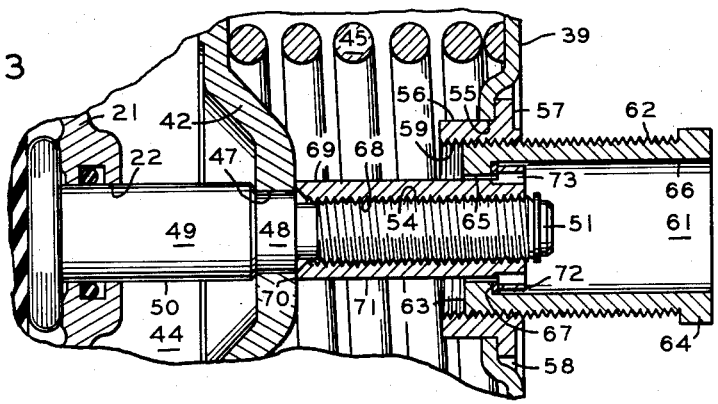
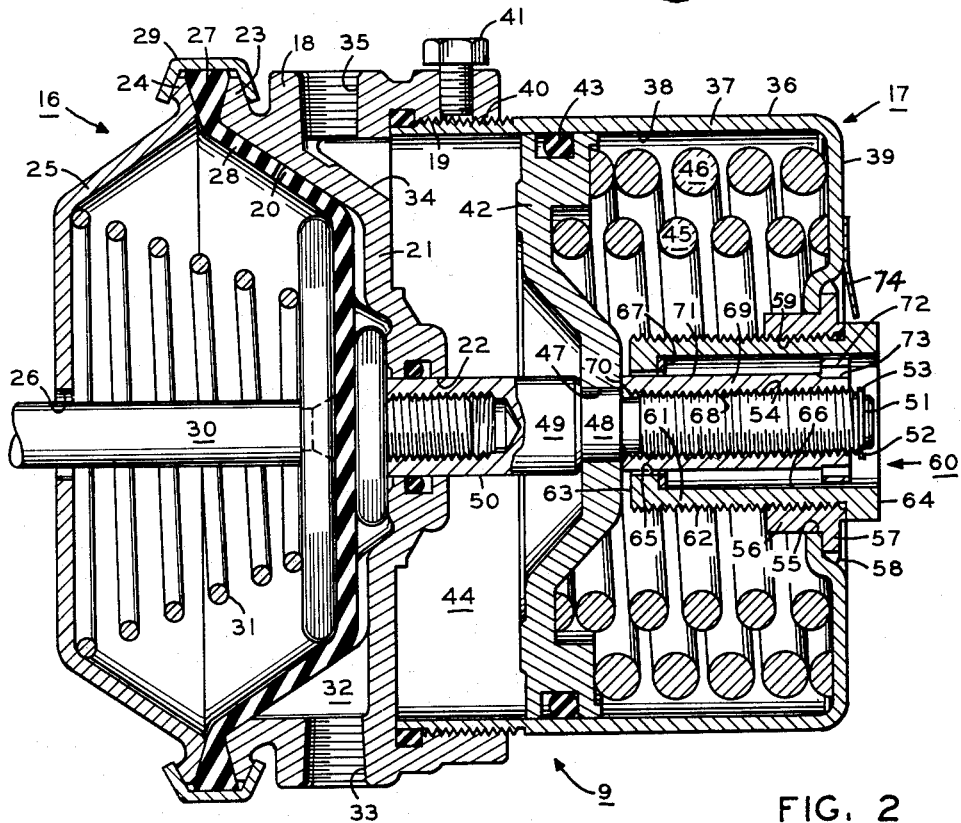

INVENTOR
OLIVER B. CRUSE
BY
*Joseph E. Papin*

United States Patent Office 3,187,642
Patented June 8, 1965

3,187,642
FRICTION DEVICE OPERATING MECHANISM
Oliver B. Cruse, Florissant, Mo., assignor to Wagner Electric Corporation, St. Louis, Mo., a corporation of Delaware
Filed Oct. 12, 1962, Ser. No. 230,180
15 Claims. (Cl. 92—128)

This invention relates to friction device operating mechanisms having resilient friction device energizing means therein and in particular to means for disabling said resilient means.

In the past, many friction device operating mechanisms have been provided with a service portion having actuator means therein for energizing a friction device in response to metered fluid pressure from a fluid pressure source and also with an emergency portion having resilient means therein for mechanically energizing said friction device when the fluid pressure supplied thereto from said source was reduced below a predetermined value. The service and emergency portions were normally secured together by suitable securing means such as a conventional clamping band, or the like, and an undesirable feature of such past friction device operating mechanisms was that upon releasing the securing means to disassemble said service and emergency portions, the resilient means propelled said emergency portion from said service portion with great force. Of course, this undesirable feature resulted in many serious injuries to mechanics servicing the vehicle.

The principal object of the present invention is to provide a friction device operating mechanism incorporating safety means therein which overcome the aforementioned undesirable feature. This object and other objects and advantages will become more apparent hereinafter.

Briefly, the invention is embodied in a friction device operating mechanism including a service portion having a friction device actuator therein, an emergency portion releasably engaged with said service portion and having emergency friction device actuating means therein powered by spring means, and means for effecting free length extension of said spring means to prevent expulsion of said emergency portion upon disassembly of said service and emergency portion.

The invention also consists in the parts and arrangements and combination of parts hereinafter described and claimed.

Figure 4:
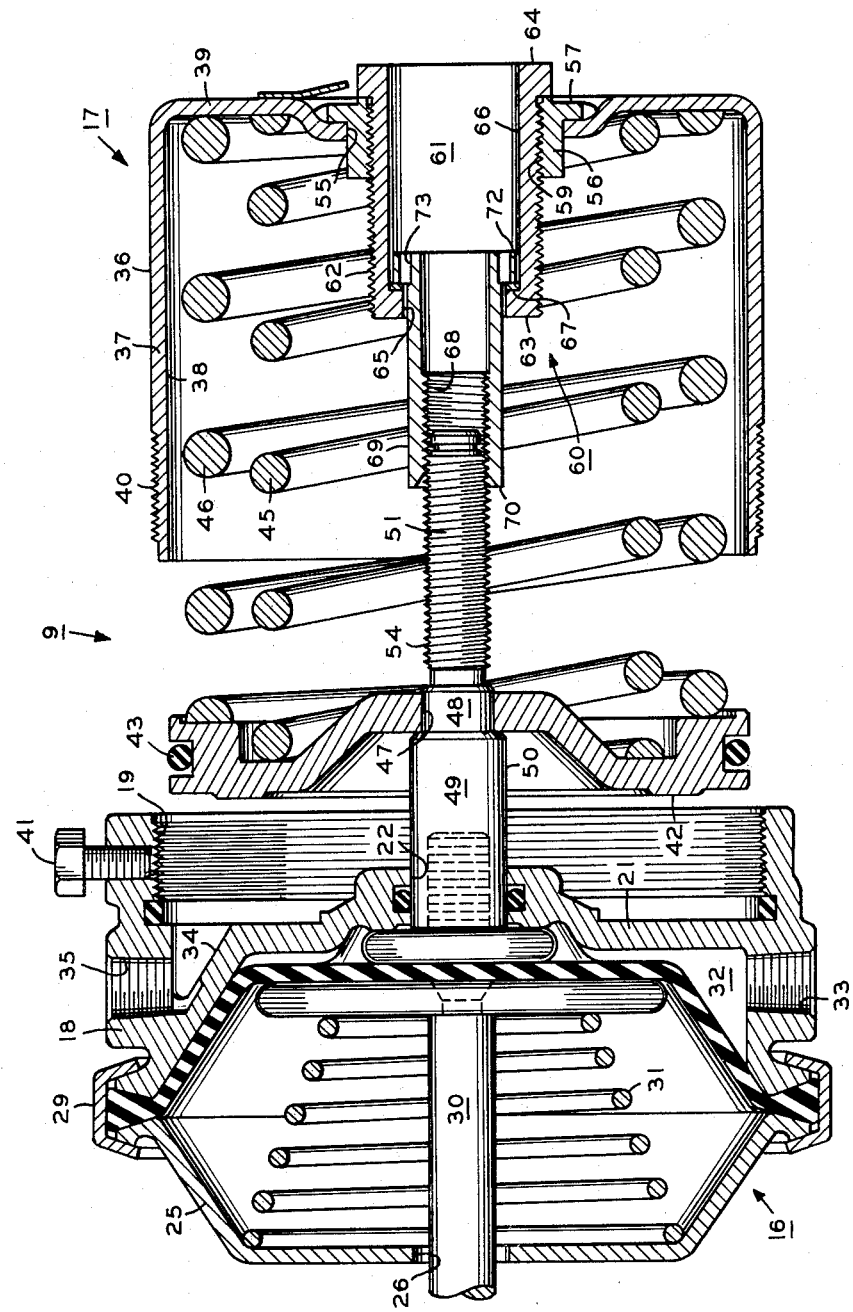
Figure 5:
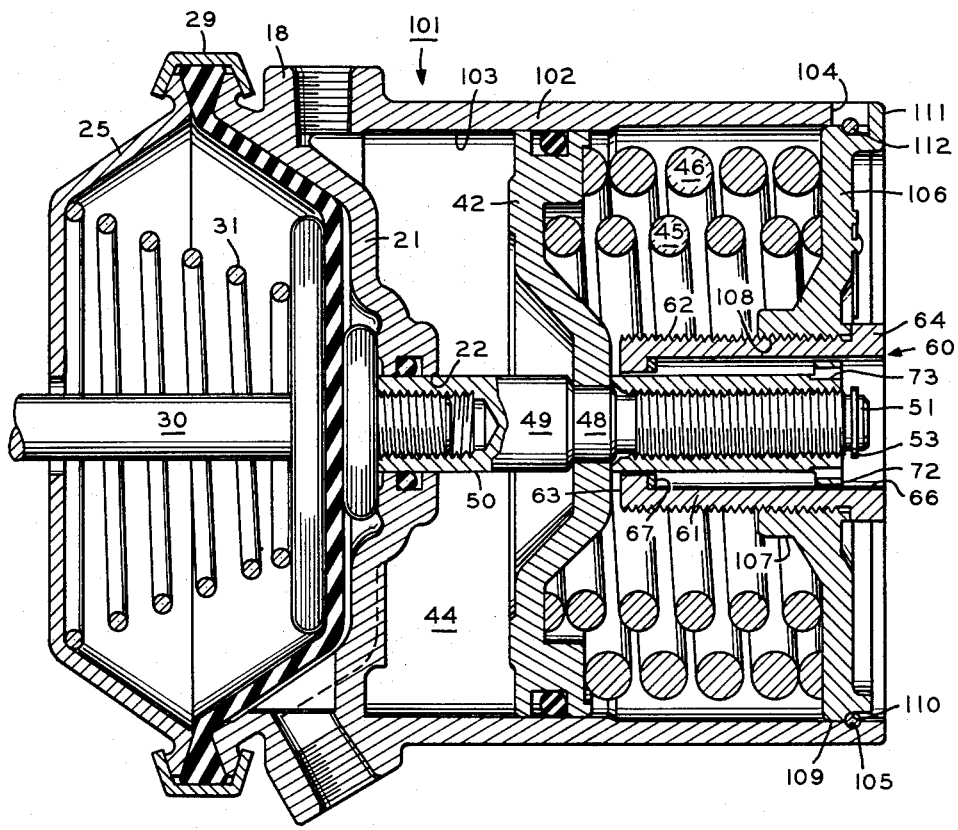
Figure 6:
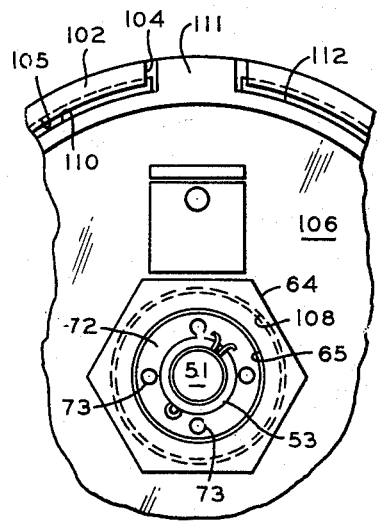

In the accompanying drawings which form a part of the specification and wherein like numerals refer to like parts wherever they ocur:

FIG. 1 is a diagrammatic view of an actuating system for a friction device with a friction device operating mechanism embodying the present invention shown therein, FIG. 2 is a greatly enlarged cross-sectional view of the friction device operating mechanism shown in FIG. 1, FIG. 3 is a fragmentary view of a portion of the friction device operating mechanism of FIG. 2 showing disabling means therefor in an actuated position, FIG. 4 is an exploded fragmentary cross-sectional view of the friction device operating mechanism of FIG. 2 showing extendable means therefor in a spring force dissipating position, FIG. 5 is a cross-sectional view of another friction device operating mechanism embodying the present invention, and FIG. 6 is a fragmentary right-end view of the friction device operating mechanism shown in FIG. 5.

Referring now to FIG. 1 in detail, a friction device actuating system, indicated generally at 1, is provided with fluid pressure generating means such as compressor 2, which is connected to an inlet 3 of a charging or control valve 4 by a conduit 5 having a fluid pressure storage reservoir 6 interposed therein, and another conduit 7 is interposed between an outlet 8 of said charging valve and the emergency port of a friction device operating mechanism or actuating cylinder 9. The charging valve 4 is provided with rotatable passage means 10 shown connecting the inlet 3 in pressure fluid communication with the outlet 8; however, said passage means can be rotated clockwise (in the direction of the arrow) to a position interrupting pressure fluid communication between said inlet and outlet and establishing pressure fluid communication between said outlet and an exhaust port 11 to vent said outlet to atmosphere. A conduit 12 has one end intersecting with the conduit 5 and the other end thereof connecting with the inlet side of an application valve 13, and another conduit or service line 14 is interposed between the service or outlet side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

Referring now to FIGS. 2 and 3, the actuating cylinder 9 includes service and emergency portions indicated generally at 16 and 17, respectively. The service portion 16 is provided with a housing 18 having a relatively short threaded cylinder receiving bore 19 in the rightward end thereof and a tapered bore 20 in the leftward end thereof, and an integrally formed wall 21 having a centrally located seal carrying aperture 22 is interposed between said bores. A peripheral flange 23 is provided on the housing 18 in opposed relation with another peripheral flange 24 integrally provided on a dish-shaped mounting end plate 25, said mounting end plate having a centrally located venting aperture 26 therein. A peripheral bead 27 of a diaphragm 28 is maintained in sealable abutting engagement between the opposed flanges 23 and 24 by a conventional releasable clamping band 29 positioned in clamping engagement with said opposed flanges. A push rod 30 extends coaxially through the venting aperture 26 having an exterior or working end operatively connected with the slack adjuster 15, as previously mentioned, and an interior end normally biasing the diaphragm 28 into abutment with the housing wall 21 in response to the compressive force of a return spring 31 interposed between the end plate 25 and said push rod. An actuation or service chamber 32 is formed in the tapered bore 20 between the diaphragm 28 and the housing wall 21, and a service port 33 which receives the conduit 14, as previously mentioned, connects with said actuation chamber. The housing 18 is also provided with an integrally formed passage 34 having one end connecting with the bore 19 and the other end thereof connecting with an emergency or control port 35 which receives the conduit 7, as previously mentioned.

The emergency portion 17 of the actuating cylinder 9 is provided with a cup-shaped cylinder 36 having an annular sidewall portion 37 with a bore 38 therein and an integrally formed base wall 39, and the cylinder sidewall 37 is provided with threads 40 adjacent the free end thereof for engagement with the threaded housing bore 19, said engagement being normally maintained by a well known expedient, such as a nylon tipped set screw 41, positioned in the housing 18 in locking engagement with the threads 40. An emergency piston 42 is slidably positioned in the cylinder bore 38 and carries an O-ring 43 in sealable engagement with said cylinder bore. An expansible emergency or control chamber 44 is formed in the bore 38 between the housing wall 21 and the piston 42 in open pressure fluid communication with the passage 34 and emergency port 35 at all times, and a pair of emergency springs 45 and 46, which may be oppositely wound to obviate interference therebetween if desired, are concentrically positioned in the bore 38 between the piston 42 and cylinder base wall 39 normally urging said piston in a working direction toward abutting engagement with the housing wall 21. The piston 42 is provided with a centrally located aperture 47, and an annular surface 48 formed adjacent the mid-portion of a shaft or piston extension 49 is pressed into said piston aperture 47; however, albeit shown a press fit, it is readily apparent that the surface 48 could be slidable in the piston aperture 47 with an O-ring sealably interposed therebetween. A portion 50 of the piston extension 49 leftward of the surface 48 is provided with a free or working end positioned in the actuating chamber 32, and said piston extension portion 50 is slidably received in the seal-carrying aperture 22 of the housing wall 21. A portion 51 of the piston extension 49 rightward of the surface 48 is provided with an annular groove 52 adjacent the free or abutment end in which is positioned an abutment member, such as a removable snap ring 53, and threads 54 are provided on the rightward piston extension 51 (to be discussed hereinafter).

The base wall 39 of the housing 36 is provided with a centrally located aperture 55 therein to receive an annular guide member 56 having an exterior end or flange 57 fixedly secured to the base wall 39 by suitable means, such as weld 58, and a threaded bore 59. Emergency release means, indicated generally at 60, is provided with a driving or release member 61 having a threaded peripheral surface 62 cooperatively received in the threaded guide member bore 59. The release member 61 is provided with an interior or free end 63 and a hexagonally shaped, exterior end or flange 64 normally engaged with the guide member flanged end 57. Stepped bores 65 and 66 are provided through the release member 61 between the opposed interior and exterior ends 63 and 64 in coaxial spaced relation with the rightward piston extension 51, and a shoulder or abutment surface 67 is formed at the juncture of said stepped bores. A threaded bore 68 of a cylindrical extendable member 69 is cooperatively received on the rightward piston extension 51, and a leftward or free end 70 of said extendable member is normally in abutment with the piston 42. The extendable member 69 is also provided with a peripheral surface 71 slidable in the stepped bore 65 and a radially outwardly extending abutment collar or flange 72 is integrally provided on the rightward end of said extendable member in sliding engagement with the releasable member stepped bore 66 and forming a lost motion connection with the abutment surface 67 on the release member 61. The stroking distance of the flange 72 relative to the abutment surface 67 is predeterminately greater than the stroking distance of the emergency piston 42 to prevent shock loading of the threaded engagement between rightward piston extension 51 and the extendable member 69 and between the release member 61 and guide member 56 upon the emergency function of the piston 42 (to be discussed hereinafter). The flange 72 is provided with a plurality of axially extending tool receiving apertures 73 therethrough, and the extendable member is retained against displacement from the rightward piston extension 51 by the snap ring 53. A spring clip 74 is fixedly attached to the cylinder base wall 39 by suitable means, such as spot welding, and extends into juxtaposition with the hexagonally-shaped release member flange 64 to prevent accidental rotation of the release member 61.

In the operation with the component parts of the actuating cylinder 9 positioned as above described, assume that normal operating conditions exist wherein the storage reservoir 6 is charged with fluid pressure above a predetermined amount from the compressor 2 and said reservoir 6 is connected in fluid pressure communication with the emergency chamber 44 through the passage 34 and emergency port 35 of the housing 18, the conduit 7, the outlet 8, passage means 10 and inlet 3 of the control valve 4, and the conduit 5. The fluid pressure so transmitted to the emergency chamber 44 acts on the effective area of the emergency piston 42 creating an emergency force to maintain said emergency piston in its normal inoperative position adjacent the interior end 63 of the release member 61 against the compressive force of emergency springs 45, 46. With the component parts of the actuating cylinder 9 positioned as above described and as shown in FIG. 2, the friction device (not shown) is de-energized.

In the operator desires to initiate a normal service application to energize the friction device and effect deceleration or a complete stop, a manual force applied on the application valve 13 meters fluid pressure from the reservoir 6 through the conduits 5 and 12, said application valve, the service line 14, and the service port 33 of the actuating cylinder 9 into the service chamber 32. The fluid pressure so established in the service chamber 32 acts on the effective area of the diaphragm 28 creating service force to move said diaphragm and push rod 30 leftwardly against the return spring 31 to actuate the slack adjuster 15 and energize the friction device. When the applied force is removed from the application valve 13, the fluid pressure is exhausted to atmosphere from the service chamber 32 through the service port 33, the conduit 14, and the exhaust port of the application valve 13 to eliminate the service force, and the compressive force of the return spring 31 moves the slack adjuster 15, push rod 30, diaphragm 28 and parts associated therewith to their original positions.

In an emergency condition when the fluid pressure in the reservoir 6 is reduced below the predetermined amount due to leaks in the system 1 or a non-producing compressor 2, or the like, the fluid pressure in the emergency chamber 44 is correspondingly reduced thereby reducing the emergency force opposing the compressive force of springs 45, 46. When the magnitude of the spring forces overcomes that of the reduced emergency force, springs 45, 46 move the emergency piston 42 leftwardly in a work-producing direction to an operating position in the bore 38, and the shaft 49 is movable therewith to actuate its working end in the actuating chamber 32 and effect simultaneous movement of the diaphragm 28, push rod 30 and slack adjuster 15 to mechanically energize the friction device. During emergency mechanical energization of the friction device, the abutment flange 72 on the extendable member 69 is also moved leftwardly in the stepped bore 66 of the release member 61 into juxtaposition with the abutment shoulder 67.

With the component parts of the system 1 and actuating cylinder 9 positioned as above described, the friction device is mechanically energized under emergency conditions to effect an emergency vehicle stop. Often such emergency vehicle stops occur at inopportune times and place the vehicle in a dangerous position with regard to other vehicles on the road; therefore, after such emergency stops occur it is advantageous and desirable to move the vehicle to a less dangerous position to correct the failure in the system 1 and/or actuating cylinder 9 and subsequently re-establish normal operating conditions.

Referring now to FIGS. 2 and 3, emergency release means 60 is provided to positively contain the compressive forces of springs 45, 46 and retractively move the piston 42 to its inoperative position to de-energize the friction device under emergency conditions, as hereinafter described. When a manual force is applied on the release member flange 64 rotating the release member 61, the threaded engagement between the release member 61 and the guide member 56 effects rightward movement of said release member to engage the abutment shoulder 67 with the abutment flange 72 on the extendable member 69, and further rightward movement of said release member effects concert rightward movement of said extendable member, the shaft 49 and the piston 42 against the compressive forces of emergency springs 45, 46. In view of the above, it is apparent that the compressive forces of springs 45, 46 are now positively contained between the piston 42 and the cylinder base wall 39 through the abutting engagement of the release member 61 and extendable member 69. When the emergency piston 42 is so moved in a rightward direction to its normal inoperative position, return spring 31 also moves the component parts associated therewith in follow-up relation wherein the friction device is de-energized so that the vehicle can now be moved to a more advantageous and less dangerous position. Any fluid pressure which the system 1 may contain can be utilized to initiate a service application, as previously described, to effect energization of the friction device when the emergency release means 60 is actuated to overcome the emergency function of the emergency springs 45, 46; and in this manner the vehicle can be controllably moved to a more advantageous and less dangerous position to correct the fluid pressure failure.

When the fluid pressure failure has been corrected and the fluid pressure in the reservoir 6 is increased to an amount greater than the predetermined amount wherein normal operating conditions are now re-established, the fluid pressure in the emergency chamber 44 of the actuating cylinder 9 is correspondingly increased to re-establish the magnitude of the emergency force. When the magnitude of the emergency force overcomes that of the compressive forces of springs 45, 46, the emergency piston 42 is moved rightwardly in the bore 38 against said springs to its inoperative position, and the release member 61 may now be freely returned to its original position.

Of course, the operator may initiate the emergency function of the actuating cylinder 9 if he so desires by "dynamiting" the system 1. To "dynamite" the system 1, the operator merely rotates the passage means 10 of the charging valve 4 in a clockwise direction (as shown by the arrow in FIG. 1) to align the passage means 10 between the outlet port 8 and the exhaust port of the charging valve 4 to vent the emergency chamber 44 to atmosphere. With the emergency chamber 44 vented to atmosphere, the emergency function of the actuating cylinder 9 is initiated, as described hereinbefore, to mechanically energize the friction device.

In order to service the various component parts in the service and emergency portions 16 and 17 of the actuating cylinder 9 and in particular those subject to failure, such as the diaphragm 28 and the emergency piston O-ring 43, it is necessary to disassemble the housing 18 and cylinder 36 from the end plate 25 and/or the cylinder 36 from the housing 18. Disassembly of the housing 18 and cylinder 36 from the end plate 25 is accomplished by removing the clamping band 29 from its clamping engagement with the housing and end plate peripheral flanges 23 and 24; however, if the fluid pressure in the emergency chamber is below the predetermined amount or has been "dynamited" to effect emergency energization of the friction device by the actuating cylinder 9 when the clamping band 29 is removed, the emergency springs 45, 46 would normally propel the housing 18 and cylinder 36 with great force from the end plate 25, and this propelling force or effect can be fatal or cause serious injuries to the person servicing the actuating cylinder 9. In order to obviate propelling effect of the springs 45, 46, emergency release means 60 is actuated, as previously described, to positively contain the compressive forces of springs 45, 46 between the piston 42 and cylinder base wall 39 through the abutting engagement of the release member 61 and extendable member 69 prior to the time the clamping band 29 is removed from its clamping engagement with the peripheral flanges 24 and 25. Since the emergency release means 60 positively contain the compressive forces of springs 45, 46, it is apparent that the housing 18 and cylinder 36 can now be safely disassembled from the end plate 25 to service the diaphragm 28 or any other component part in the service portion 16 of the actuating cylinder 9.

Referring now to FIGS. 2–4, in order to service the component parts in the emergency portion 17 of the actuating cylinder 9, the springs 45, 46 must first be extended to their free length before the cylinder 36 can be disassembled from the housing 18, and the present invention provides for manual disassembly of said housing and cylinder without removing the actuating cylinder from the vehicle and without the use of a press, or the like, to obviate the propelling effect of said springs 45, 46 while effecting free length extension thereof. With the emergency release means 60 actuated to positively contain the compressive forces of the springs 45, 46, as previously described, the snap ring 53 is removed to permit relative movement between the extendable member 69 and piston extension 51, and a tool (not shown) is inserted through the rightward end of the release member bore 66 into torque transmitting engagement with the tool receiving apertures 73 in the extendable member flange 72. Since the extendable member flange 72 is biased into abutment with the release member shoulder 67 by the compressive forces of springs 45, 46, the extendable member 69 is axially immovable but is rotatable in response to torque applied thereto by the tool, and the threaded engagement between the extendable member 69 and the rightward piston extension 51 effects leftward movement of the piston 42 and component parts associated therewith until the piston 42 engages the housing wall 21, said springs being extendable with said piston. Upon release of the set screw 41 in the housing 18 from engagement with the cylinder side wall 37, the cylinder 36 and extendable member 69 are concurrently rotatable wherein said cylinder is moved rightwardly relative to the piston 42 to disengage the cylinder side wall threads 40 from the threaded housing bore 19, and springs 45, 46 are further extendable in response to the rightward movement of said cylinder. A force is now applied on the release member flange 64 to rotate the release member 61, and the threaded engagement between said releasable member and the guide member 56 effects further rightward movement of the cylinder 36 relative to the piston 42 in response to the compressive force of the springs 45, 46. When the cylinder 36 is so moved a predetermined distance to the right relative to the piston 42, the springs 45, 46 attain extension to their free length thereby obviating their propelling effect. In this manner, the extendable member 69 can now be threadedly disengaged from the rightward piston extension 51, and the component parts in the emergency portion 17 of the actuating cylinder 9 are accessible for servicing.

In order to reassemble the emergency portion 17, the release member 61 is moved to its normal position wherein the flange 64 thereof is re-engaged with the guide member flange 57, and the extendable member 69 is threadedly re-engaged with the rightward piston extension 51 until the free end 70 thereof is re-engaged with the piston 42. A force is again applied to the release member flange 64 effecting rotation thereof, and the threaded engagement between said release member and the guide member 56 effects leftward movement of the cylinder 36 against the emergency spring forces to move the cylinder sidewall threads 40 into juxtaposition with the threaded housing bore 19. The cylinder 36 and the release member 61 are then concertly rotatable to effect further leftward movement of said cylinder to return the cylinder sidewall 37 to its original position in threaded engagement with the housing bore 19. Further rotation of the release member 61 returns it to its original position with the flange 64 thereof engaging the guide member flange 57, and the piston 42 is again engaged with the housing wall 21 with the compressive forces of springs 45, 46 contained between said piston and cylinder base wall 39 through the abutting engagement of the extendable member flange 72 and the release member shoulder 67. When fluid pressure is again supplied from the reservoir 6 to the emergency chamber 44, the piston 42 is again moved against the emergency spring force to its normal inoperative position, and the snap ring 53 may be reinserted into its cooperating groove 52 in the rightward piston extension 51.

The present actuating cylinder 9 is provided with a removable service portion 16 having actuation means therein responsive to applied fluid pressure from a source of said fluid pressure to normally effect energization of a friction device, and a removable emergency portion 17 is also provided with resilient means therein protractively movable to mechanically energize said friction device when fluid pressure supplied thereto from said source is reduced below a predetermined amount. Emergency release means 60 is movable in response to an applied force into containing engagement with said resilient means to obviate the propelling effect thereof and to retractively move said resilient means to de-energize said friction device wherein the service portion 16 can be disassembled to service the component parts thereof. In addition, the resilient means is provided with extendable connecting means 69 which is manually operable in conjunction with emergency release means 60 to effect free length extension of said resilient means obviating the propelling effect thereof so that the emergency portion 17 can be disassembled and reassembled to service the component parts thereof without removing the actuating cylinder 9 from the vehicle and without using presses, or the like, to contain the force of said resilient means during disassembly and reassembly.

Referring now to FIGS. 5 and 6, a friction device operating mechanism 101 is shown having substantially the same component parts and functioning in substantially the same manner as the previously described friction device operating mechanism 9 with the following exceptions. The housing 18 is provided with an integrally formed cylinder 102 having a bore 103 therein. The cylinder 102 is slotted at 104, and a snap ring receiving groove 105 is provided in the bore 103 adjacent the open end thereof. A bore closure member or end wall 106 is provided with a cylindrical extension 107 having a threaded bore 108 therein for threaded engagement with the release member 61 of emergency release means 60. A peripheral surface 109 having an annular recess 110 is provided on the wall 106 in sliding and guiding engagement with the bore 103, and a radially extending member or flange 111 is integrally formed on said surface 109 for engagement with the cooperating cylinder groove 104 to prevent rotation of said wall 106 in said bore 103. A split lock or retaining ring 112 is positioned in the groove 105, and the compressive force of springs 45, 46 acting on the wall 106 serves to bias the recess 110 thereof into engagement with said ring 112 to retain said wall 106 against displacement from the cylinder bore 103.

To disassemble the actuating cylinder 101, the emergency chamber 44 is vented to atmosphere, the snap ring 53 is removed from the rightward piston extension 51, and the emergency actuating means 60 is actuated, as previously described, to positively retain the forces of springs 45, 46 between the emergency piston 42 and the endwall 106. Upon removal of the clamping band 29 to separate the housing 18 from the end plate 25, the wall 106 can be manually moved leftwardly in the bore 103 to remove the split lock ring 112 from the groove 105. A force is now applied to rotate the release member 61, and the threaded engagement between said release member and the wall extension bore 108 effects rightward movement of the wall 106 in response to the compressive forces of springs 45, 46 until said wall engages the release member flange 64, said springs being expandible with the rightward movement of said wall. In this position, the release member shoulder 67 and the extendable member flange 72 are still maintained in engagement by the compressive force of springs 45, 46. A tool (not shown) is inserted through the release member bore 66 into torque transmitting engagement with the tool receiving apertures 73 in the extendable member flange 72 to rotate the extendable member 69, and the threaded engagement between said extendable member and the rightward piston extension 51 effects concert rightward movement of said extendable member, the release member 61 and the wall 106 relative to the piston 42 in response to the compressive forces of springs 45, 46 until said springs attain their free length extension. After the springs 45, 46 are so extended to their free length, the extendable member 69 is threadedly disengaged from the rightward piston extension 51, and the component parts of the actuating cylinder are accessible for service.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. A friction device operating mechanism comprising a pair of releasably secured housings, resilient means movably mounted in one of said housings and having a working end extending exteriorly thereof, said resilient means normally exerting a force on said one housing in a direction to effect separation thereof from the other of said housings, extendable means connected with said resilient means, and disabling means connected in lost motion relation between said one housing and extendable means, said disabling means being movable in response to an applied force into engagement with said extendable means to contain the force of said resilient means and prevent actuation of the working end thereof, and said extendable means being extendable to at least partially dissipate the force of said resilient means upon release of said releasable housings.

2. A friction device operating mechanism comprising a pair of separable housings, releasable means normally securing said housings against separation, a chamber in one of said housings, piston means slidable in said chamber and having a working end extending exteriorly of said one housing, spring means exerting a force between said one housing and piston means, extendable means on said piston means, disabling means connected in lost motion relation between said one housing and extendable means, said disabling means being movable into engagement with said extendable means to contain the force of said spring means between said one housing and piston means, and said extendable means being movable to effect relative movement between said disabling means and piston means to at least partially dissipate the force of said spring means upon the release of said releasable means to separate said housings.

3. A friction device operating mechanism comprising a pair of separable housings, releasable means normally securing said housings against separation, an expansible chamber in one of said housings, piston means slidable in said chamber, a pair of opposing extensions on said piston means, one of said extensions having a working end extending exteriorly of said chamber, spring means in said chamber between said one housing and piston means and normally urging the working end of said one extension toward an operative position to actuate the working end of said one extension, means for introducing fluid pressure into said chamber, said piston means being movable against the force of said spring means toward an inoperative position in response to fluid pressure in said chamber above a predetermined amount, extendable means connected with the other of said extensions, disabling means connected in lost motion relation between said one housing and extendable means, said disabling means being movable in response to an applied force into engagement with said extendable means to positively contain the force of said spring means between said one housing and piston means, and said extendable means being movable in response to an applied force thereon to effect relative movement between said disabling means and piston means to permit extension of said spring means dissipating at least a portion of the force thereof upon release of said releasable means to separate said housings.

4. A friction device operating mechanism comprising a pair of separable housings, releasable means normally secured with said housings to prevent relative displacement thereof, an expansible chamber in one of said housings, a piston slidable in said chamber and having oppositely extending extensions, one of said piston extensions extending exteriorly of said chamber and having a working end thereon, spring means between said one housing and piston, said spring means normally exerting a force on said one housing in a direction to displace said one housing from the other of said housings and a force on said piston means to energize the working end of said one extension, means for introducing fluid pressure into said chamber on one side of said piston, said piston being movable against the force of said spring toward an inoperative position to de-energize the working end of said one piston extension in response to fluid pressure in said chamber above a predetermined amount, a rotatable extension threadedly received on the other of said piston extensions, disabling means threadedly engaged with said one housing and connected in lost motion engagement with said extension, said disabling means being movable relative to said one housing in response to an applied force thereon into engagement with said extension to positively contain the force of said spring between said one housing and piston means and prevent energization of the working end of said one piston extension, and said extension being threadedly rotatable on said other piston extension in response to an applied force to move said piston relative to said disabling means and extend said spring dissipating at least a portion of the force thereof upon release of said releasable means to separate said housings.

5. A friction device operating mechanism comprising a pair of releasably secured housings, an expansible chamber in one of said housings, piston means slidable in said chamber, oppositely disposed extensions on said piston means, one of said extensions having a working end extending exteriorly of said chamber, a cylinder having an axial bore and a peripheral portion threadedly received in said one housing, a first abutment flange formed on said cylinder, an extendable member threadedly received on the other of said extensions, a second abutment flange on said extendable member and slidable in said cylinder bore, spring means between said one housing and piston means normally urging said working end of said one extension in a working direction, said cylinder being movable in said one housing in response to an applied force to engage said first abutment flange with said second abutment flange to effect a rigid connection between said one housing and piston means and positively contain the force of said spring means therebetween, and said extendable member being movable on said other extension to effect relative movement between said cylinder and piston and free length extension of said spring means dissipating the force thereof upon release of said releasably secured housings.

6. A friction device operating mechanism comprising fixed and separable housings, removable securing means normally connecting said housings against separation, a chamber in said separable housing, a piston slidable in said chamber, extension means on said piston, spring means biased between said piston and separable housing and having a compressive force normally urging said piston in a working direction and said separable housing in a direction away from said fixed housing, disabling means reciprocally mounted in said cylinder, an extendable member on said extension means connected in lost motion engagement with disabling means, said disabling means being movable in said cylinder in response to an applied force to engage said extendable member wherein the compressive force of said spring means is contained between said piston and separable housing to prevent expulsion of said separable housing from said fixed housing upon subsequent removal of said removable securing means, and said extendable member being movable on said extension means in response to an applied force to effect relative movement of said piston and separable housing towards free length extension of said spring means to completely dissipate the compressive force thereof and prevent relative expulsion of said separable housing and piston.

7. A friction device operating mechanism comprising a pair of releasably secured housings, resiliently urged means movable in one of said housings and defining therewith an expansible fluid pressure chamber, said resiliently urged means exerting a force to effect separation of said housings and oppose expansion of said chamber to mechanically energize a friction device when the fluid pressure in said chamber is less than a predetermined amount, and a pair of telescopically arranged extendable means defining a lost motion connection between said one housing and resiliently urged means to contain the force thereof and substantially prevent friction device energization when the fluid pressure in said chamber is less than the predetermined amount, one of said extendable means being extendable to effect relative movement between said one housing and resiliently urged means to at least partially dissipate the force of said resiliently urged means upon release of said housing and the establishment of said lost motion connection.

8. A friction device operating mechanism comprising a pair of releasably secured housings, one of said housings including a cylinder portion releasably secured thereto, resiliently urged means movable in said cylinder portion, said resiliently urged means normally exerting a force to effect separation of said housings and said one housing and cylinder portion, and extendable means defining between said cylinder portion and resiliently urged means a lost motion connection, said extendable means being inititally extendable to partially dissipate the force of said resiliently urged means upon the establishment of said lost motion connection and the release of said housings and said extendable means being further extendable to effect substantially complete dissipation of the force of said resiliently urged means upon the release of said one housing and cylinder portion.

9. A friction device operating mechanism comprising a pair of releasably secured housings, one of said housings including a cylinder portion releasably secured thereto, resiliently urged means movable in said cylinder portion and defining therewith and said one housing portion an expansible fluid pressure chamber, said resiliently urged means exerting a force to effect separation of said housings and said one housing and cylinder portion and being movable to energize a friction device when the fluid pressure in said chamber is less than a predetermined value, and a pair of extendable means defining a lost motion connection between said cylinder portion and resiliently urged means to contain the force thereof and prevent friction device energization when the fluid pressure in said chamber is less than the predetermined value, said extendable means being initially extendable to partially dissipate the force of said resiliently urged means upon the establishment of said lost motion connection and the release of said housing and said extendable means being thereafter further extendable to effect substantially complete dissipation of the force of said resiliently urged means upon the subsequent release of said one housing and cylinder portion.

10. A friction device operating mechanism comprising a housing having a separable closure member movable therein, means releasably secured to said housing and adapted for engagement with said closure member to prevent separation thereof, resiliently urged means movable in said housing and normally exerting a force on said closure member to urge said closure member into engagement with said releasably secured means, disabling means movable in said closure member, and extendable means defining a lost motion connection between said disabling means and resiliently urged means, said disabling means and extendable means providing a substantially rigid connection between said closure member and resiliently urged means to positively contain the force thereof upon the establishment of said lost motion connection, said closure member being movable in said housing in response to an applied force thereon to a position disengaged from said releasably secured means to permit the release thereof from said housing when the force of said resiliently urged means is positively contained, said extendable means being thereafter extendable to effect relative movement between said closure member and resiliently urged means to partially dissipate the force thereof, and said disabling means being movable in response to an applied force thereon to provide further relative movement between said closure member and resiliently urged means to effect substantially complete dissipation of the force thereof.

11. The friction device operating mechanism according to claim 10 comprising means engaged between said housing and closure member to substantially prevent rotative displacement therebetween.

12. The friction device operating mechanism according to claim 10 wherein said resiliently urged means includes piston means slidable in said housing, and spring means engaged between said piston means and closure member.

13. The friction device operating mechanism according to claim 12 wherein said housing includes a bore in which said piston means and closure member are slidable, and an annular groove in said bore adjacent to the open end thereof, said releasably secured means including a split retainer ring positioned in said groove, said spring means normally urging said closure member into displacement preventing engagement with said split retainer ring.

14. The friction device operating mechanism according to claim 12 wherein said piston means includes an extension, said extendable means being threadedly engaged with said piston means extension, a bore in said closure member, said disabling means including a cylinder member threadedly received in said closure member bore and coextensive with at least a portion of said extendable means, and an abutment surface on each of said extendable means and cylinder member defining said lost motion connection.

15. The friction device operating mechanism according to claim 14 wherein said cylinder member includes a stepped bore having a shoulder therebetween defining said abutment surface thereon, and said extendable means including a sleeve portion in threaded engagement with said piston means extension and extending through the smaller of said stepped bores, and radially extending flange means on said sleeve portion movable in the larger of said stepped bores and defining the abutment surface on said extendable means.

References Cited by the Examiner
UNITED STATES PATENTS

| | | | |
|---|---|---|---|
| 2,754,805 | 7/56 | Berman | 92—63 |
| 3,101,219 | 8/63 | Herrera | 92—63 |
| 3,107,583 | 10/63 | Woodward | 92—63 |
| 3,109,347 | 11/63 | Brodl, et al. | |
| 3,112,959 | 12/63 | Kateley. | |
| 3,117,496 | 1/64 | Dobrikin | 92—128 |
| 3,131,609 | 5/64 | Dobrikin et al. | 92—128 X |
| 3,136,227 | 6/64 | Williams | 92—128 X |

RICHARD B. WILKINSON, *Primary Examiner.*